Feb. 5, 1957

F. H. WHITE 2,780,121

PIPE BENDER

Filed July 28, 1954

FRANK H. WHITE INVENTOR.

BY ROBERT O. WRIGHT
HIS ATTORNEY

United States Patent Office 2,780,121
Patented Feb. 5, 1957

2,780,121

PIPE BENDER

Frank H. White, Rome, N. Y.

Application July 28, 1954, Serial No. 446,283

2 Claims. (Cl. 81—15)

This invention relates to apparatus for forming conduit, pipe and the like and more particularly concerns a pipe bender for forming conduit, pipe and the like around corners and other objects.

Heretofore there have been various pipe benders available and others suggested but all have either been too complicated to be practical or have damaged the conduit and pipe in bending unless used only be experts. According to the present invention I have provided a pipe bender that may be made very easily and economically and yet will not kink or damage the pipe being bent when used by even a novice.

Accordingly it is an object of the present invention to provide a simple pipe bender that may be used by non-skilled labor without danger or injury to the pipe. It is another object to provide a pipe bender that is rugged and yet simple and economical of manufacture. It is a further object to provide a pipe bender that may be cast in a simple mold and finished with a minimum of machining operations. It is a further object to provide a pipe bender that can be used to bend or straighten pipe without change of position thereon and without damage to the pipe. These and other and further objects will be in part apparent and in part pointed out as the specification proceeds. In the drawings:

Figure 1:
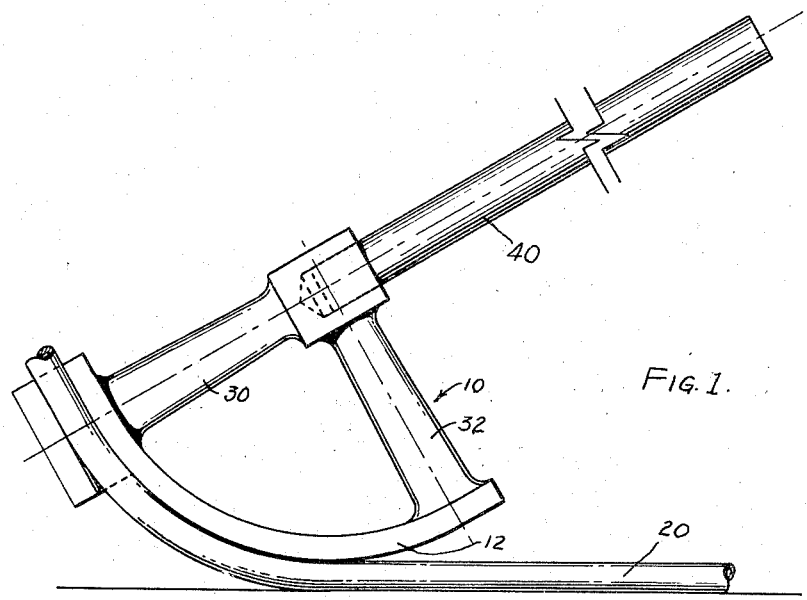
Fig. 1 is a side elevation of the pipe bender according to the present invention applied to a pipe with about a sixty-degree bend formed therein.

Referring now to Fig. 1, the pipe bender 10 comprises a flat plate 12 formed in an arc of slightly greater than 90° about a center of curvature 14. Positioned at one end of plate 12 and forming an integral part thereof is a pipe engaging block 16. The inner wall 18 of block 16 is merely an extension of plate 12 while outer wall 20 is joined to plate 12 by web 22 to form therebetween a channel 24 open on one side and into which a pipe 26, Fig. 1 may be inserted for forming.

A handle receiving barrel 28 is mounted at approximately the center of curvature of plate 12 by spokes 30 and 32 which are secured to plate 12 adjacent the ends thereof at 34 and 36 respectively. Additional spokes or even a solid web may be provided if desired in place of spokes 30 and 32. Barrel 28 is preferably hollow at the upper end and provided with threads 38 so that a length of pipe 40 or other means may be inserted as a handle. This permits the tool to be easily stored and also allows various length handles to be used depending on the size and type of pipe or conduit to be bent.

Figures 2, 3:
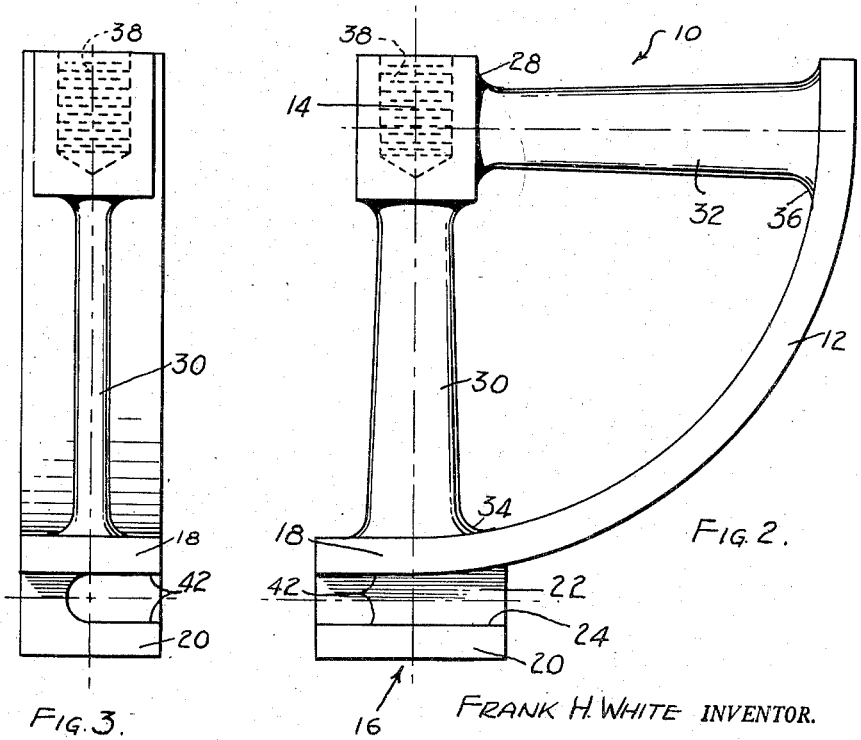
Fig. 2 is an enlarged plan view of the pipe bender of Fig. 1.
Fig. 3 is an end elevation of the pipe bender of Fig. 2.

As may be seen in Fig. 2 wall 20 of channel 24 is straight and does not follow the curve of plate 12. This forms a channel gradually diverging from the mouth 42 which facilitates inserting and removing the pipe to be bent. Also wall 20 is extended along plate 12 a distance from four to eight times the diameter of mouth 42. This extended surface serves not only as a large area of contact on the initial bending thus preventing injury to the pipe or conduit, but also permits straightening of the pipe without damaging it if it should be bent too far. A further advantage of this construction is that the pipe may be straightened without removing the tool.

Advantageously the entire pipe bender of the present invention is cast as a single piece in a simple two piece mold. The construction as set forth above is ideally suited for such manufacture which permits its quick and economical manufacture, the only machining step required being the provision of threads 38 if desired.

As shown in Fig. 3 when made in this manner, web 22 is curved to fit and support the pipe to be bent and also to strengthen the support of wall 20. Also the spokes 30 and 32 may be strengthened with fillets when they are joined to plate 12 at 34 and 36.

To use the pipe bender of the present invention a length of pipe 40 (Fig. 1) is threaded into barrel 28 and block 16 hooked over the pipe 26 adjacent the portion to be bent. Downward pressure is then applied to handle 40 which bends pipe 26 along plate 12 smoothly and evenly without kinking or otherwise damaging the pipe. It is readily apparent that regardless of the pressure on or the abruptness of its application to handle 40 the broad surface of plate 12 will not damage pipe 26 even though a full ninety-degree bend is formed.

If more than the desired bend is formed the pipe may be easily and simply straightened by lifting on handle 40 causing wall 20 in cooperation with mouth 42 to remove some of the bend, all without changing the position of the pipe bender.

While there is given above a certain specific example of this invention and its application in practical use, it should be understood that this is not intended to be exhaustive or to be limiting of the invention. On the contrary, this illustration and explanation herein are given in order to acquaint others skilled in the art with this invention and the principals thereof and a suitable manner of its application in practical use, so that others skilled in the art may be enabled to modify the invention and to adapt and apply it in numerous forms each as may be best suited to the requirement of a particular use.

I claim:

1. Apparatus for forming conduit, pipe and the like which comprises a smoothly curved plate portion extending through an angle of at least 90 degrees; a barrel member positioned within the arc of said plate portion and integrally joined thereto adjacent each end of said plate; coupling means in one end of said barrel for receiving the end of a handle; a work engaging member at one end of said curved plate portion; said work engaging member having spaced walls providing a channel open on one side, one wall of said channel being a curved extension of said plate portion and the other wall of said channel being a straight work engaging portion having a length of four to eight times the narrowest width of said channel whereby the work may be bent and straightened without removing the forming apparatus and without kinking or other damage thereto.

2. A pipe bender for making smoothly curving bends in pipe, conduit and the like without kinking thereof which comprises a narrow rectangular plate curved into a sector of a circle of approximately 90 degrees; a pipe engaging block integrally formed on the convex side of one end of said plate, said block having spaced walls providing a pipe engaging channel open on one side; the outer wall of said channel being substantially straight and the inner wall forming a curved continuation of the convex surface of said plate; a handle receiving barrel portion and a plurality of spokes joining said barrel to the concave side of said plate whereby by inserting a handle in said barrel and engaging a pipe in the channel of said block the pipe may be smoothly bent or straightened to the desired curvature without damage to the walls thereof.

References Cited in the file of this patent

UNITED STATES PATENTS

| | | |
|---|---|---|
| 780,756 | Lakin | Jan. 24, 1905 |
| 1,452,383 | Jones | Apr. 17, 1923 |
| 2,568,694 | Bachli et al. | Sept. 25, 1951 |
| 2,571,241 | Henderson | Oct. 16, 1951 |
| 2,584,537 | Benfield | Feb. 5, 1952 |